United States Patent

[11] 3,613,810

| [72] | Inventors | Donnelly L. Hetteen;<br>Gerald D. Reese, both of Roseau, Minn. |
|---|---|---|
| [21] | Appl. No. | 844,316 |
| [22] | Filed | July 24, 1969 |
| [45] | Patented | Oct. 19, 1971 |
| [73] | Assignee | Texron Inc.<br>Providence, R.I. |

[54] SUSPENSION SYSTEM FOR TRACKED VEHICLES
6 Claims, 4 Drawing Figs.

[52] U.S. Cl. .................................................. 180/5 R,
180/9.58, 305/22, 305/28
[51] Int. Cl. ........................................................ B62d 27/02
[50] Field of Search ........................................ 305/24, 22,
27, 28; 180/5

[56] References Cited
UNITED STATES PATENTS

| 1,276,035 | 8/1918 | Crane | 180/5 |
| 2,617,659 | 11/1952 | Grenier | 180/5 X |
| 3,285,676 | 11/1966 | Hetteen | 305/27 |
| 3,309,150 | 3/1967 | Marier | 305/27 |
| 3,404,745 | 10/1968 | Smieja | 180/5 |
| 3,485,312 | 12/1969 | Swenson | 305/24 X |
| 1,070,301 | 8/1913 | Stadig | 180/5 A |
| 2,312,071 | 2/1943 | Broadwater | 180/5 |
| 3,369,622 | 2/1968 | Thomas | 180/5 |
| 3,480,096 | 11/1969 | Hammitt | 180/5 |

*Primary Examiner*—Richard J. Johnson
*Attorney*—Merchant & Gould

ABSTRACT: A suspension system for a tracked vehicle including a unitary suspension frame with track wheels mounted thereon for engagement with the lower run of the drive track. Idler means mounted on the rear end of the suspension frame support the rear end of the drive track. Spring means are provided to support the vehicle body on the suspension frame. The spring means are connected such that a predetermined amount of longitudinal relative movement is permitted between the suspension frame and the body. A rearwardly and downwardly sloping control arm is pivotally connected between the body and the front end of the suspension frame so that the forwardly located track wheels are forced downwardly by the control arm when the suspension frame moves forwardly with respect to the body.

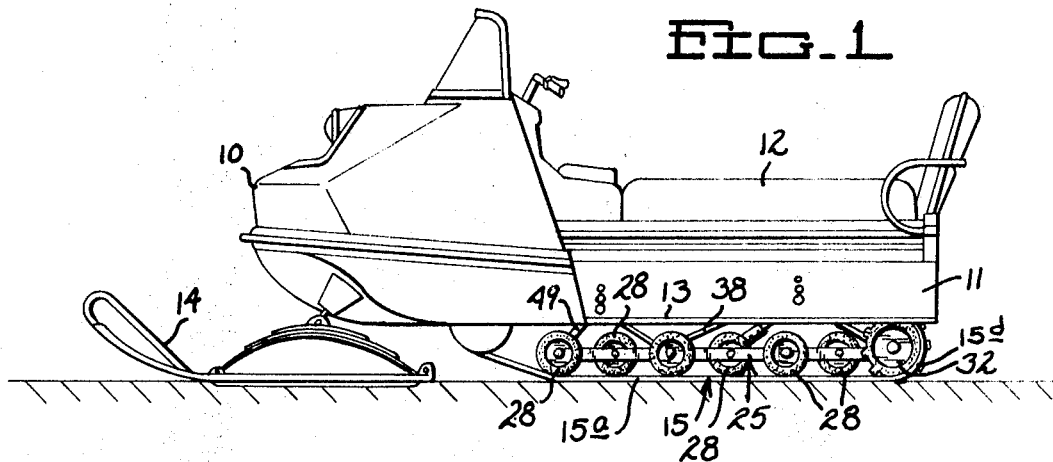
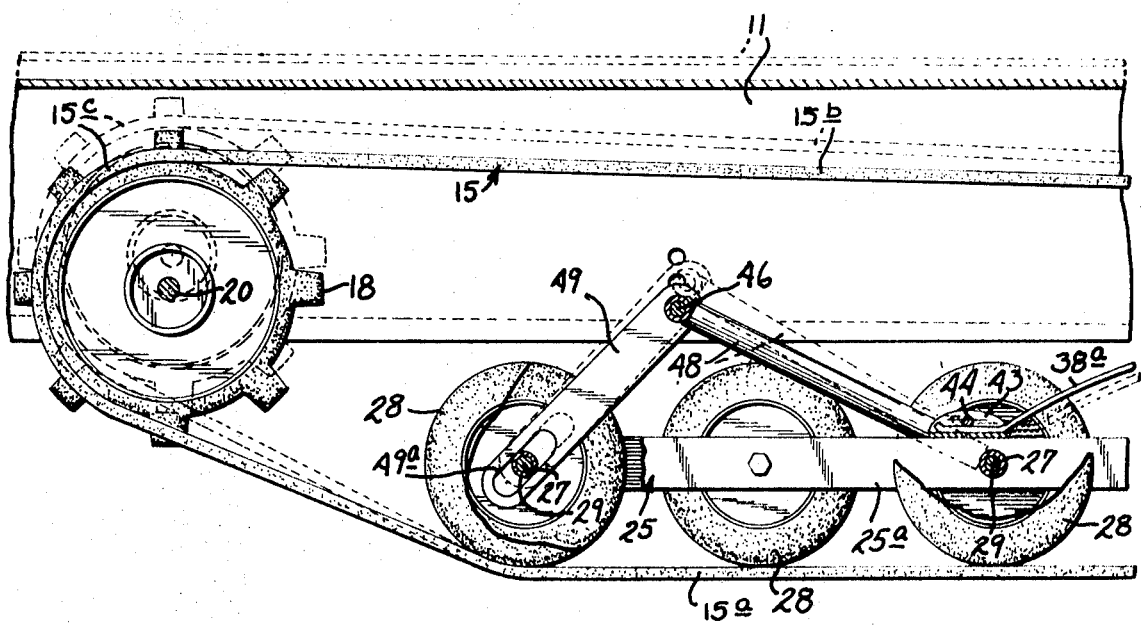

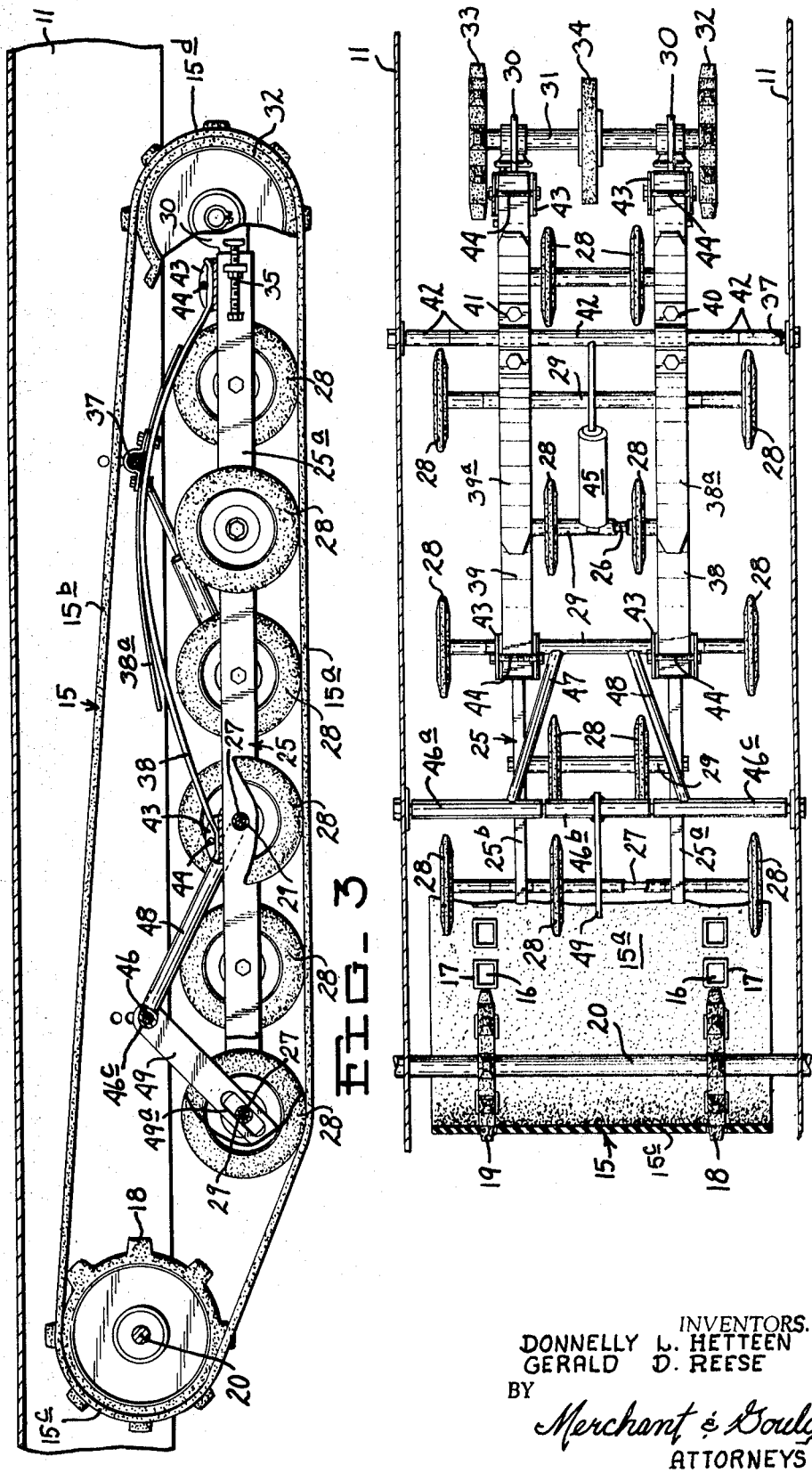

SUSPENSION SYSTEM FOR TRACKED VEHICLES

BACKGROUND OF THE INVENTION

1. Field of the Invention

This invention relates generally to suspension systems for vehicles and more particularly relates to an improved track wheel-type suspension system for a tracked vehicle that is supported and propelled by endless drive track means.

2. Description of the Prior Art

Because of the increased popularity of snowmobiles and all-terrain vehicles among the general public in recent years, manufacturers of these vehicles have expended considerable effort in researching the function of the suspension system and in finding approaches to improving vehicle performance and ride. Of course, performance and ride must be related to the desires of the purchaser. The normal purchaser usually desires both a smooth ride and reasonable performance. The racing driver, on the other hand, desires the ultimate in performance, without much regard to comfort.

It is known that the best performance is achieved if the lower run of the track is maintained in a flat condition so that the vehicle does not have to, in effect, continuously progress over a series of hills formed by the track. This ripple effect will occur with a bogie-wheel-type suspension system such as that shown in the Marier U.S. Pat. No. 3,309,150 that issued Mar. 14, 1967. Although the type of suspension system shown in the Marier patent is not successful in maintaining the track in a flat condition, it has been popular because of the comfortable ride it gives. Other prior art suspension systems have employed one or more longitudinally extending, relatively rigid slide rails engaging the lower drive run of the track. Although a slide rail system will overcome the ripple effect and maintain the track in a flat condition, it does have certain disadvantages. If snow is not available to lubricate a slide rail, it will wear out rapidly because of the presence of dirt between it and the track. Even if snow is available, but is hard and granular from freezing and thawing, it will not provide sufficient lubrication to prevent rapid wear and deterioration of the slide rails. Therefore, if a tracked vehicle is to be used by the general public over many types of terrain, some form of wheel-type track suspension system is desirable.

Another problem with the bogie-wheel-type suspension system of the type shown in the Marier patent, is the fact that the bogie wheels are constantly changing positions as their supporting springs flex. As a result, the wheels are not evenly spaced over the drive run of the track under all operating conditions. This increases the ripple effect and absorbs considerable power in merely moving the wheels back and forth with respect to the track.

A further performance requirement is that the drive track remain in contact with the ground over its entire length so that the best flotation and driving characteristics are obtained. As with other vehicles, the normal tendency of a tracked vehicle is to rise at its front end when power is applied. When this happens, the front end of the drive track may lose contact with the ground, thus reducing its effectiveness in supporting and propelling the vehicle. This problem was overcome to some extent in the vehicle shown in the E. E. Hetteen U.S. Pat. No. 2,970,662 that issued Feb. 7, 1961. The Hetteen patent disclosed means interposed between a traction unit and a sledge unit to impart a downward thrust to the forward end of the drive track when power was applied. In particular, the front end of the traction unit was secured to the sledge unit by a camming arrangement that forced the front end of the traction unit downwardly into tighter engagement with the ground when power was applied to the track. The overall suspension system of the type shown in the Hetteen patent, however, has generally been abandoned commercially in favor of suspension systems like that shown in the Marier patent.

Another recent innovation in suspension systems employing track-engaging wheels is shown in the Trapp U.S. Pat. No. 3,446,303 that issued May 27, 1969. Those prior art systems akin to that shown in the Marier patent have generally provided a soft and comfortable ride but have failed to provide more than a minimum of acceptable performance. On the other hand, those vehicles employing more rigid suspension systems designed for maximum performance, have often been uncomfortable to ride and difficult to handle. Further, the average purchaser of a vehicle employing slide rails is often not aware of the problems that can occur if the vehicle is used over ground not having a snow cover.

SUMMARY OF THE INVENTION

The present invention provides a new combination of elements forming a suspension system for tracked vehicles that meets all of the above requirements for a vehicle sold to the general public. This suspension system will maintain the track in a flat condition, will tend to force the entire track surface into engagement with the ground whenever power is being applied, and is also comfortable to ride and easy to control.

A unitary, semirigid, suspension frame is positioned between the upper and lower runs of the drive track. A plurality of track wheels are rotatably mounted on the frame by means of a number of shafts extending transversely of the frame. Except for some flexing of the frame that occurs, the bottom edge of all the track wheels, and thus the drive track, are held in the same plane by the frame and associated shafts. As the relative positions of the track wheels do not change, the ripple effect is drastically reduced. Further, the vehicle will operate equally well over dry ground or snow, as the lubricating effect of the snow is not necessary.

A relatively soft ride is achieved by mounting the vehicle body on the suspension frame by suitable spring means. Shock absorber means are also provided to damp excessive oscillation of the spring means. The spring means are connected to the suspension frame by mounting means permitting a predetermined amount of relative longitudinal movement between the unitary frame and the vehicle body. The forward end of the suspension frame is connected to the vehicle body by means of a downwardly and rearwardly sloping control arm pivotally connected to both. Any forward movement of the suspension frame with respect to the vehicle body causes pivoting of the control arm resulting in increased downward pressure on the forward portion of the drive track. Because the rear idler assembly is connected directly to the rear end of the suspension frame, this action occurs whenever power is applied to the track through the front drive sprocket.

These and other attributes of this new combination will become more apparent upon consideration of the following specification and attached drawings.

BRIEF DESCRIPTION OF THE DRAWINGS

FIG. 1 is a view in side elevation of a vehicle incorporating the suspension system of this invention;

FIG. 2 is an enlarged fragmentary view in side elevation of the suspension system, portions thereof being broken away and portions being shown in section;

FIG. 3 is a top plan view of the suspension system shown in FIG. 2, portions thereof being broken away and portions being shown in section; and FIG. 4 is a greatly enlarged view in side elevation of the front portion of the suspension system and drive track, portions thereof being broken away and portions being shown in section, and showing an alternate position thereof.

DESCRIPTION OF THE PREFERRED EMBODIMENT

Referring now to the drawings, wherein like reference numerals are used throughout the several view to indicate like elements of the invention, there is disclosed in FIG. 1 a vehicle having an elongated unitary body including a nose portion 10 and an inverted, generally U-shaped rear portion 11. A seating portion 12 is carried by the rear portion 11, and a footrest member 13 extends outwardly from each side of the bottom edge of rear portion 11. Nose portion 10 is primarily supported by a pair of steerable skis 14, one of which is shown in FIG. 1.

Mounted beneath and partially within the confines of the inverted, generally U-shaped rear portion 11 is an endless drive track 15. Preferably, endless drive track 15 is molded in a single piece from rubber, although the particular form of track used is not critical to the present invention. Endless track 15 is provided with two spaced rows of sprocket-engaging openings 16 formed at spaced intervals along the length thereof. Preferably, each of the openings 16 is provided with a rectangular, metal reinforcing and wear element 17 designed to engage the sprocket teeth to reduce wear on the track. The construction and function of these wear elements 17 are more fully described in the copending Richards U.S. Pat. application Ser. No. 767,641 filed Oct. 15, 1968. Again, however, it should be emphasized that the particular form of belt and its approach to engaging the drive sprockets are not critical to the present invention.

A pair of sprocket wheels 18 and 19 are mounted on a laterally extending drive shaft 20. Drive shaft 20 extends laterally across the forward end of U-shaped rear portion 11. Each of the drive sprocket wheels 18 and 19 has a plurality of sprocket teeth extending through openings 16 of the associated row of openings for driving engagement of the track. Although not shown on the drawings, one end of the drive shaft 20 is provided with a metal, tooth sprocket wheel for engagement with a drive chain extending from the transmission. As shown on the drawings, the two sprocket wheels 18 and 19 not only provide driving force for the drive track 15 but also support the front end thereof.

Drive track 15 has a lower ground-engaging drive run 15a, an upper return run 15b, a front end portion 15c engaging sprocket wheels 18 and 19, and a rear end portion 15d located adjacent the rear end of the body.

An elongated, semirigid, unitary suspension frame 25 is positioned between drive run 15a and return run 15b. Suspension frame 25 comprises a pair of longitudinally extending, parallel frame members 25a and 25b. Frame members 25a and 25b are held in this spaced relationship by a plurality of short shafts 26 bolted at each end of a frame member, and a plurality of alternately located longer shafts 27 that extend through openings in the frame members and terminate a predetermined distance on each side of the frame 25.

Mounted on each of the short shafts 26 are a pair of track wheels, each being designated by the numeral 28. Each of the long shafts 27 has a pair of track wheels 28 mounted one at each end thereof. The long shaft 27 at the front of the frame has an additional track wheel rotatably mounted on it between the two frame members 25a and 25b.

Each of the mounting shafts 26 and 27 carries a suitable tubular sleeve or sleeves 29 to space the track wheels 28 from each other and from the frame members 25a and 25b. Each of the track wheels 28 is mounted on a suitable bearing to permit rotation thereof with respect to the associated shaft. The track wheels 28 are thus positioned in spaced relation on the frame 25 between the front and rear ends thereof, for rolling engagement with the upper surface of drive run 15a. The track wheels are spaced both longitudinally and laterally so that support is given to the entire ground-engaging drive run 15a to hold it as flat as possible. Except for some flexing of the frame 25 in response to normal shocks encountered during operation of the vehicle, frame 25 will tend to hold the track-engaging portion of each track wheel 28 in the same plane. Suspension frame 25 will thus react as a unit rather than as a separate series of suspension devices.

Secured to the rear end of suspension frame 25 by a pair of suitable clamps 30 is an idler assembly including a cross-shaft member 31, a pair of idler sprocket wheels 32 and 33, and a smooth idler wheel 34 positioned along the centerline of drive track 15. Drive track 15 is entrained over this rear idler assembly with the teeth on sprocket wheels 32 and 33 engaging the openings 16 in their respective rows of openings. Associated with the clamps 30 are threaded adjustment devices 35 that an operator can adjust to change the tension on the drive track. The threaded adjustment devices 35 move the idler assembly rearwardly or forwardly with respect to the frame 25. It should be noted at this point that the rear idler assembly is supported solely by suspension frame 25 and is not in any way directly connected to the vehicle body.

Extending laterally across rear portion 11, through openings in the opposite vertical sidewalls thereof, is a support shaft 37, that extends below the return run 15b and above the suspension frame 25. The ends of shaft 37 are threaded and are secured to the rear portion 11 by suitable threaded nuts as shown in FIG. 3. Mounted on shaft 37 are two spaced sets of leaf springs 38, 38a and 39, 39a. The two sets of leaf springs are held together and mounted for pivotal movement on shaft 37 by a pair of suitable clamps 40 and 41 bolted to the leaf springs on opposite sides of the shaft. The two sets of leaf springs on opposite sides of the shaft. The two sets of leaf springs are held in a spaced, parallel relationship directly over frame members 25a, 25b by suitable tubular spacer members 42 mounted on shaft 37.

As best shown in FIG. 2, the main central portion of each of the long leaf springs 38 and 39 is curved, but the opposite ends thereof are flat and lie in a horizontal plane when mounted on the vehicle. Each flat end portion rests in a bracket member 43 having a flat bottom portion secured to a frame member 25a, 25b, and a pair of laterally spaced upstanding portions on opposite sides of the leaf spring. The flat end portion of the leaf spring thus rests in the flat bottom portion of the bracket member 43. A bolt 44 is connected between the two upstanding portions of each bracket member 43 directly above the leaf spring. As best shown in FIGS. 2 and 4, the extreme ends of the long leaf springs 38 and 39 are curved upwardly a short distance to form a lip that engages bolt 44 as the frame 25 moves longitudinally with respect to leaf springs 38 and 39. The upstanding lateral portions of each bracket member 43 thus prevent lateral shifting of the leaf springs and support for the bolt 44. The bolt 44 should pass in close proximity to the upper surface of the leaf spring to prevent twisting of the leaf spring between the bolt and the base of bracket member 43. In the preferred embodiment of our invention, both ends of the two leaf springs 38 and 39 have been provided with flat portions to permit relative movement between the leaf springs and the frame 25. We have also used a suspension system, however, wherein the rear ends of the two leaf springs 38 and 39 are secured for pivotal movements only so that relative movement occurs only between the front ends of the leaf springs and the frame. In order to obtain the requisite fore and aft movement of the frame with respect to the vehicle body, at least one end of the leaf springs must be permitted to slide or move as herein described. Of course, other means of securing the leaf springs to the frame for relative movement could also be used.

The shorter leaf springs 38a and 39a have a larger and radius of curvature than the long leaf springs 38 and 39 so that the opposite ends thereof are spaced from the surface of the long leaf spring when mounted thereon, as best shown in FIG. 2. When more weight is added to the vehicle, or when heavy shocks are encountered that tend to flatten the longer leaf springs, the shorter leaf springs engage the longer ones over their entire length to add firmness to the suspension system. This combination gives a softer ride under ordinary conditions but does not bottom out under heavy load or when heavy shocks occur. To aid in damping oscillations of the leaf springs, a shock absorber 45 is mounted between shaft 37 and the next forwardly located short shaft 26.

Another mounting shaft 46 extends across the body between the upper and lower runs of the drive track 15, as previously described for shaft 37. Shaft 46 is positioned above the front end of frame 25 and rearwardly of the drive sprocket wheels 18 and 19. Rotatably mounted on shaft 46 are three tubular spacers 46a, 46b and 46c. Welded or otherwise secured to the two outer spacers 46a and 46c are a pair of control arms 47 and 48 that slope downwardly and rearwardly therefrom for connection at their lower ends to the tubular spacer on the next rearwardly located long shaft 27. The upper ends of the control arms 47 and 48 are thus pivotally connected with respect to the vehicle body, and the lower ends of the control arms are pivotally connected with respect to the suspension frame 25. The control arms 47 and 48 aid in supporting the body on the suspension frame, but also perform an additional, most important function.

FIG. 4 discloses in full lines a normal position of the vehicle and suspension frame. When power is applied to the drive track, the various elements move to a different position as shown in phantom. The reason for this and the resultant effect are as follows. When power is applied, sprocket wheel 18 rotates in a counterclockwise direction and pulls the upper return run 15b to the left as viewed in FIG. 4. As upper run 15b is pulled to the left, it exerts a forward force on the rear idler assembly including idler sprocket wheels 32 and 33, tending to move the idler assembly forwardly with respect to the vehicle body. This force is transmitted by the rear idler assembly to the unitary suspension frame 25, which moves a short distance forwardly as permitted by the connection between it and the leaf springs 38 and 39. This forward movement of frame 25 is relative to the body, so can be considered a rearward movement of the body. Thus, in FIG. 4, the frame 25 and track wheels are shown as not moving, but the body is shown as moving rearwardly to the phantom position. The effect of this relative movement between the frame 25 and the body is to cause control arms 47 and 48 to pivot about the two mounting shafts to the phantom position of FIG. 4. The vehicle body can be considered to be supported by shaft 37, so that when control arms 47 and 48 are pushed forwardly by the frame 25, the body must pivot upwardly about shaft 37. The result of this movement is that more pressure is exerted downwardly on the forwardly located track wheels to force the front end of the drive track into tighter engagement with the ground. Contrary to normal vehicle operation, the greatest amount of downward pressure is exerted on the front end of the track when the vehicle is accelerating. However, the control arms will exert downward pressure on the front of the drive track whenever power is being applied to the track. A link member 49 is connected between spacer 46b and the spacer on the front long shaft 27. An elongated slot 49a is provided in the lower end of link member 49 through which shaft 27 extends. Link member 49 permits sufficient movement of the two control arms so that they perform their intended function, but prevents the control arms from either moving downwardly to a position adjacent the frame or too far upwardly. If the link member 49 is not used, the system will still operate properly under normal conditions. If, however, the vehicle is accelerated very rapidly, the control arms may pivot completely over center and fail to return. If this occurs, the operator will have considerable difficulty in returning the control arms to their normal position. For that reason, the link member 49 is provided.

The steering of the vehicle is also favorably affected by this suspension system. During acceleration or straight running under power, the nose portion 10 of the vehicle will be raised because of the control arm action tending to force the front track wheels into tighter engagement with the track. When the nose portion is raised, the skis exert less pressure on the ground reducing frictional drag. When the vehicle is decelerated, however, the control arms return to their normal position, permitting the nose portion of the vehicle to move downwardly and place more weight on the skis. With more weight on the skis, better steering is possible.

As shown on the drawings, the two vertical side panels of U-shaped rear portion 11 are provided with mounting holes for the two shafts 37 and 46. In the embodiment shown, the two shafts are mounted in the lower mounting holes. The result is a higher vehicle profile, better performance and clearance in deep snow, and less weight on the skis. If the two shafts 37 and 46 are moved to a higher set of mounting holes, a lower profile is achieved together with a lower center of gravity. This results in better vehicle stability, and more weight on the skis for steering. The less experienced operator would probably wish to mount the shafts in the higher mounting holes to obtain greater stability and ease of steering. Variations in these characteristics can be achieved by mounting the rear shaft 37 in one set of holes and the front shaft 46 in a pair of holes at a different level. Although three sets of mounting holes are shown on the drawings, it is evident that four or more could be provided if a wider range of mounting positions were desired.

The suspension system of the present invention provides the soft and comfortable ride that is necessary on a vehicle that is sold to the general public. In spite of this, however, unusual performance and stability are achieved because of the unique features outlined above.

What is claimed is:

1. A suspension system for a snowmobile having an elongated body with ski steering means mounted on the forward end thereof, drive sprocket means mounted intermediate the ends thereof, and a single, endless flexible drive track mounted beneath said body and having a front end portion thereof entrained over said drive sprocket means for driving engagement therewith, said track having a lower ground-engaging run, an upper return run, and a rear end portion located adjacent the rear end of said body, comprising:
    a. an elongated, semirigid, unitary suspension frame with first and second ends, positioned between said drive run and said return run of said track;
    b. a plurality of track wheels rotatably mounted in longitudinally and laterally spaced relation on said suspension frame between said first and second ends, in rolling engagement with said drive run of said track;
    c. idler means mounted on said second end of said unitary suspension frame for supporting said rear end portion of said track;
    d. first means including leaf spring suspension means having a central portion thereof connected to said body and opposite ends thereof connected to said frame urging said track wheels into engagement with said drive run and including mounting means for said leaf spring suspension means providing a predetermined amount of relative longitudinal movement between said body and said frame, said leaf spring suspension means comprising the sole spring means connected between said body and frame; and
    e. downwardly and rearwardly sloping control arm means having a forwardly located end thereof pivotally mounted on said body and a rearwardly located end thereof pivotally mounted on said frame between said first means and said first end to increase the downwardly directed pressure on said end of said unitary frame upon said frame moving forwardly with respect to said body.

2. The apparatus of claim 1 including shock absorber means mounted between said body and said frame between the ends of said leaf spring means to damp the movements thereof.

3. The apparatus of claim 1 wherein said leaf spring means comprise a first pair of longitudinally extending, spaced-apart leaf springs having the ends thereof connected to said frame, and a second pair of shorter leaf springs having a larger radius of curvature and mounted on said first pair to add firmness to the suspension after an initial amount of fattening of the first pair of springs occurs.

4. The apparatus of claim 1 including means for limiting the pivotal movement of said control arm means, said limiting means including a link member connected to said forwardly located end of said control arm means, said link member having an elongated slot therein, and a cross-shaft on said frame extending through said slot.

5. In a vehicle having an elongated unitary body with an endless drive track having a lower ground-engaging run and an upper return run, and having drive means engaging the front end of said drive track, an improved suspension system, comprising:
    a. a suspension frame positioned between said upper and lower runs;
    b. means mounted on said frame for engaging the lower run of said track;
    c. means for supporting a rear end of said drive track;

d. a pair of leaf springs mounted on said body;
e. means attaching opposite ends of said leaf springs to said frame for limited relative longitudinal movements therebetween;
f. a pair of control arms pivotally connected between a forwardly located portion of said frame and said body to increase the distance therebetween upon said frame moving forwardly with respect to said body; and
g. a shock absorber connected between said body and said frame between the ends of said leaf springs to damp the movements thereof.

6. In a vehicle having a unitary body and an endless drive track including a lower ground-engaging run and an upper return run, and having drive means engaging the front end of said drive track, an improved suspension system, comprising in combination:
a. a unitary, semirigid, suspension frame positioned between said upper and lower runs;
b. a plurality of track wheels rotatably mounted on said frame for engaging the lower run of said track at spaced intervals over the ground-engaging portion thereof;
c. idler means for supporting a rear end of said drive track;
d. leaf spring suspension means having a center portion thereof mounted on said body;
e. means attaching the ends of said leaf spring suspension means to said frame for limited relative longitudinal movements between said body and said frame;
f. means mounted forwardly of said leaf spring suspension means to pivot a forward end of said frame away from said body upon said frame moving forwardly with respect to said body;
g. said means mounted forwardly of said suspension means comprising downwardly and rearwardly sloping control arm means having a forwardly located end thereof pivotally mounted on said body and a rearwardly located end thereof pivotally mounted on said frame; and
h. link means for limiting the pivotal movements of said control arm means.